Oct. 2, 1923.  
E. R. BORDEN  
1,469,579  
POWER TRANSMISSION DEVICE  
Filed Aug. 4, 1922    3 Sheets-Sheet 1
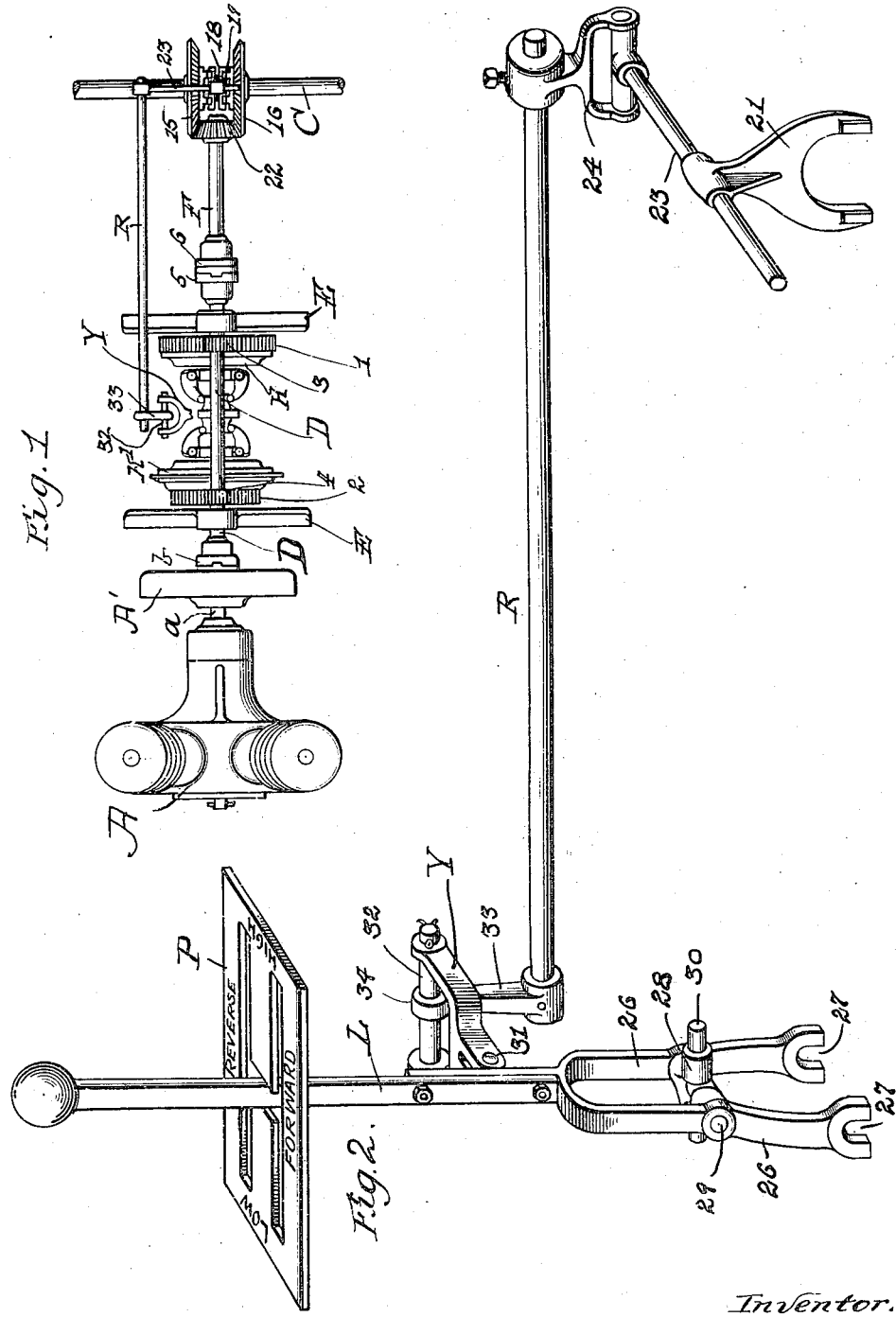

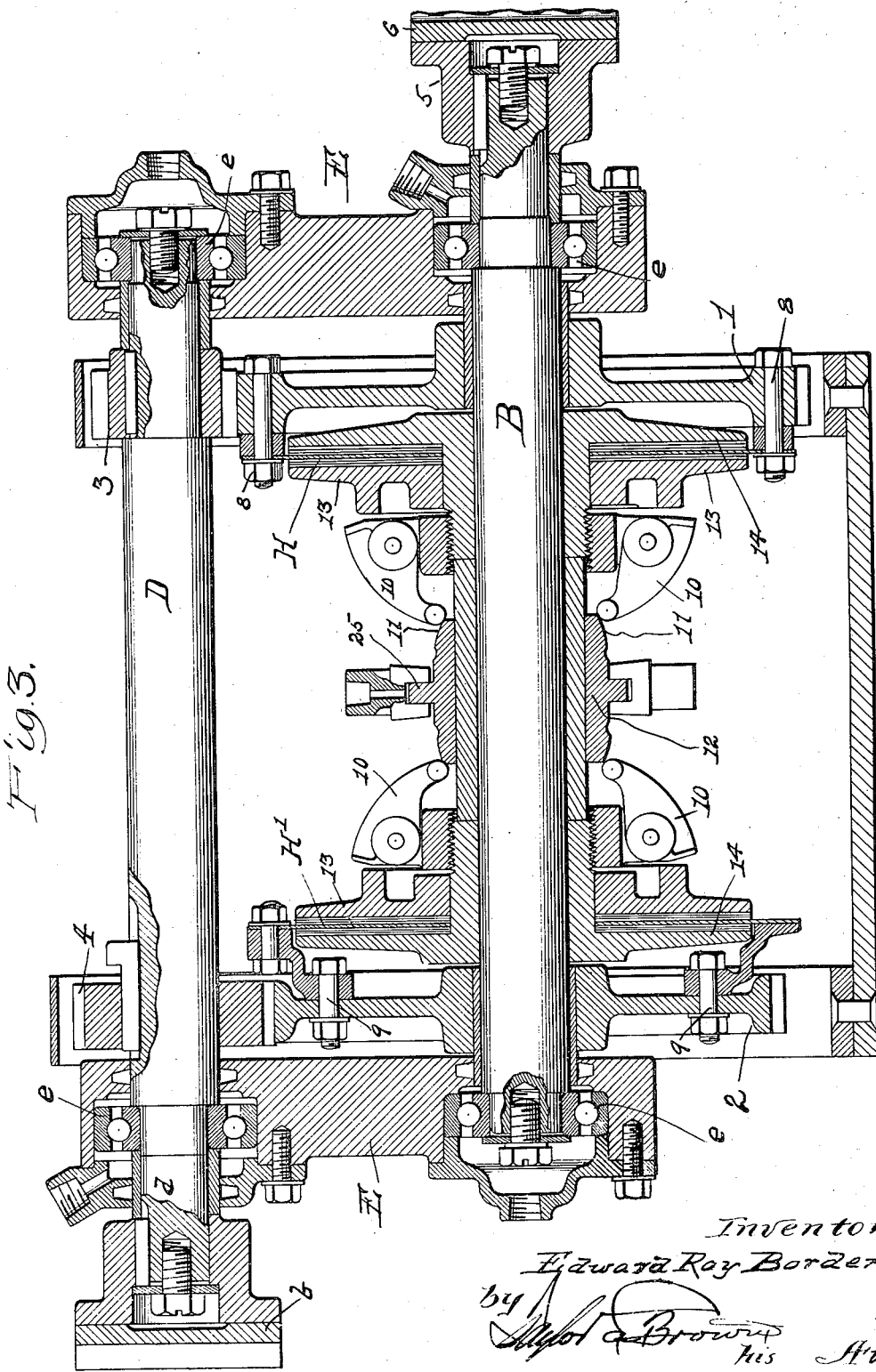

Oct. 2, 1923.

E. R. BORDEN 1,469,579

POWER TRANSMISSION DEVICE

Filed Aug. 4, 1922   3 Sheets-Sheet 3

Inventor:
Edward Ray Borden
by [signature]
his Atty

Patented Oct. 2, 1923.

1,469,579

UNITED STATES PATENT OFFICE.

EDWARD ROY BORDEN, OF CHICAGO, ILLINOIS, ASSIGNOR TO MUDGE & COMPANY, OF CHICAGO, ILLINOIS, A CORPORATION OF ILLINOIS.

POWER-TRANSMISSION DEVICE.

Application filed August 4, 1922. Serial No. 579,569.

*To all whom it may concern:*

Be it known that I, EDWARD ROY BORDEN, a citizen of the United States, residing at Chicago, in the county of Cook and State of Illinois, have invented certain new and useful Improvements in Power-Transmission Devices, of which the following is a specification, reference being had to the accompanying drawings, and to the reference characters marked thereon, which form a part of this specification.

This invention relates to improvements in power transmission devices, and more particularly to that class of such devices which employ a friction disc clutch or drive unit; such, for example, as are used on motor driven inspection cars for railways.

This class of devices depends for the transmission of power from the motor to the driven shaft or rear axle of the car, upon the friction between the smooth, flat rim of a wheel, usually fibre covered, and the smooth face of a cast iron disc, which latter is the driving member. In action, and particularly when the "load" is heavy, there is a heavy thrust upon the driving shaft which makes for inefficiency. One general difficulty consists in the wearing of flat spots on the fibre covered wheel due to the high pressure necessary when starting under a heavy load.

The principal object of my invention, therefore, is to produce a construction of the class described, in which the end thrust referred to is entirely eliminated.

Another object is to provide a transmission device, compact and in which the control will be simple: that is to say, in which there will be two speeds forward and two speeds reverse controlled by a single operating lever.

Another object is to provide a construction which will not have troublesome drive chains and no gear shifting, the gears being always in mesh. These and other advantages will be manifest as I proceed with the specification of my invention, which consists in the device and combination of devices herein illustrated and described and more particularly set forth in the claims.

In the accompanying drawings:

Fig. 1 is a plan outline view of a power plant transmission device embodying my invention.

Fig. 2 is a perspective view, on a larger scale, of the control lever and associated parts.

Fig. 3 is a vertical sectional view, enlarged, taken longitudinally of the pinion and gear shafts of the device.

Figure 4:
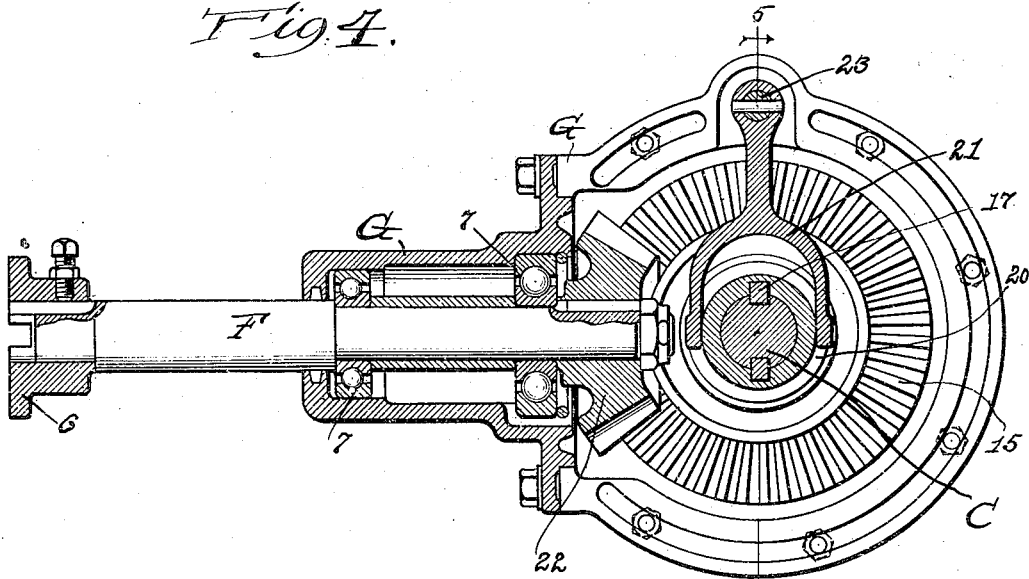
Figure 5:
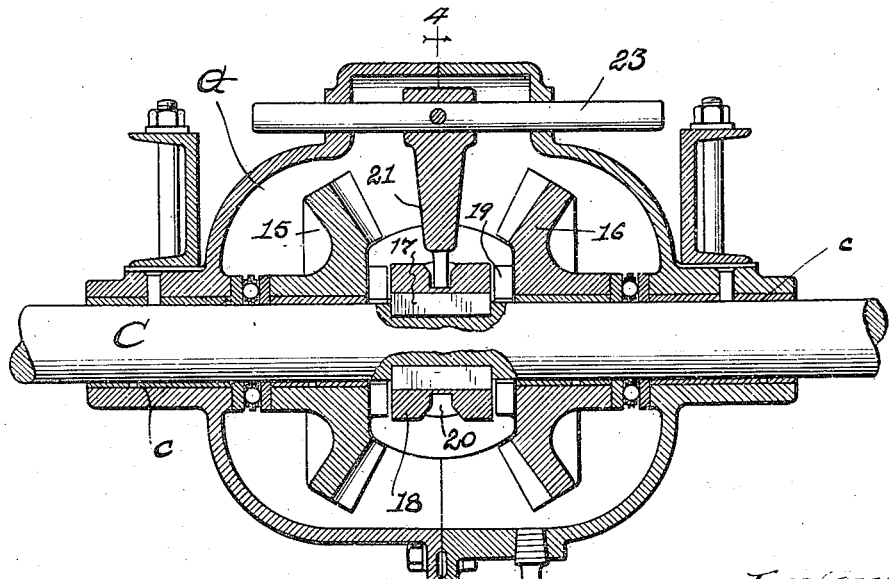

Figs. 4 and 5 are vertical sectional views, enlarged, of the reversing gears and housing, the sections being taken in the planes indicated by the dotted lines 4—4 and 5—5 respectively.

In said drawings, A is a motor which may be of the twin-cylinder V-type, its shaft $a$ provided with the usual fly-wheel A' being coupled at $b$ to the end $d$ of a power shaft D, which in effect is an extension of the motor shaft $a$. The power is transmitted, through an intermediate driving shaft B and its connections, from the power shaft D to the shaft or rear axle C. Upon the driving shaft B are a pair of loosely mounted or free-running spur gears 1 and 2, which mesh with spur pinions 3 and 4 keyed to the power shaft D. This shaft D is in the line with and directly above the driving shaft B. Each shaft B and D is rotatably mounted in the supports or frame members E, which carry suitable antifriction ball bearings, each designated as a unit $e$. The shaft B carries one member 5 of a shaft coupling, the other coupling member 6 being on an extension shaft F, which is suitably mounted in the bearing 7 of the reversing gear housing G.

Intermediate the high speed gear 2 and the low speed gear 1, the shaft B carries a pair of clutches of the twin-disc type indicated at H, H', the former being bolted at 8 to the low speed gear 1 and the latter similarly secured at 9 to the high speed gear 2. The clutch H has a set of pivoted arms or fingers 10, the free ends of which are adapted for engagement by the annular cam surface 11, of a clutch collar or sleeve 12 keyed to the shaft B, so as to slide thereon. When the collar 12 is shifted towards said fingers 10, the latter bear against the disc 13 and force this disc into frictional contact with the other disc member 14, thereby locking the gear 1 to the shaft B to rotate therewith. The clutch H' is similarly constructed and operates to lock the gear 2 to the shaft B.

When the spur gear 1 is thus clutched to the driving shaft B, low speed is transmitted to the driven shaft C from the power shaft D, through pinion 3, gear 1, shaft B and extension shaft F; and when the spur gear 2 is clutched to the shaft B, high speed is transmitted to the driven shaft C from the power shaft D, through pinion 4, spur gear 2, driving shaft B, and extension shaft F.

The reversing mechanism connected with the shaft F will now be described. The housing G has suitable bearings c, c, for the driven shaft or rear axle C. On the rear axle and within said housing are a pair of oppositely facing, spaced apart beveled gears 15 and 16, each loosely mounted on the axle C to freely rotate thereon. Intermediate said beveled gears 15, 16, and suitably keyed at 17 to the axle C, is a slidable clutch collar 18 adapted to be moved longitudinally of the axle C toward the one or the other of the gears 15 and 16, as desired.

The outside faces of the collar 18 and the proximate faces of the gears 15 and 16 are provided with complemental clutch notches and lugs 19 of a familiar type, so as to engage and lock together the collar 18 with the one or the other of said gears. The collar 18 is provided with a circumferential centrally arranged groove 20, which is engaged by the arms of a fork or lever 21, whereby said collar 18 may be moved lengthwise of the axle C.

On the inner end of the shaft F, within the housing, and intermediate the two gears 15, 16, is a beveled pinion 22 keyed to the shaft F and in mesh with the two beveled gears 15 and 16. It will be understood that when the gear 15 is locked to the rear axle or driven shaft C by the collar 18, the power transmitted through the shaft F, beveled pinion 22, and gear 15, will cause the axle C to rotate in one direction; and when the collar 18 is locked to the gear 16, the rotation of the shaft F, in the same direction as before, will, through the pinion 22 and gear 16, cause the axle C to rotate in the reverse direction.

The yoke 21 is secured to the shaft 23, having bearing support in the upper part of the housing G. Motion is communicated to the shaft 23 from a rocker shaft R, by a link arm 24 to which one end of the shaft 23 is secured.

The clutch collar 12 is provided, between its cam surfaces 11, 11, with a circumferential flange 25, and is actuated to slide toward the clutch H or the clutch H' as occasion requires, by means of a lever L. The lower end of this lever is provided with a yoke 26, the arms of which are spread apart a distance greater than the diameter of the clutch collar 12, each arm being adapted, by reason of the recess 27, to have its ends straddle the flange 25.

Above the ends of the yoke 26, I provide a yoke support 28, upon which the yoke 26 is pivotally mounted upon trunnions 29.

The support 28 is provided with a pair of trunnions 30, at right angles to the bearing trunnions 29, by which the support 28 may itself be pivotally mounted in suitable bearings in the frame of the device. It will be understood that the yoke 26 will have a pivotal movement about the trunnions 29 while the yoke and the support 28 will have a bodily or pivotal movement with respect to the frame, by means of the trunnions 30.

The upper end of the yoke 26 is bolted to the lever L. Y is a yoke pivotally secured at 31 to the upper end of the yoke 26, and carries between its yoke arms a short shaft or rod 32. Mounted upon the proximate end of the rocker shaft R is is a link 33 having its upper end 34 suitably apertured to afford a sliding bearing for the rod 32.

It will be understood from this construction that when the lever L is moved in one direction, such movement will swing the yoke 26 about the trunnions 29, and at the same time slide the rod 32 through the apertured link 33, thus producing the necessary movement to actuate the clutch collar 12, but producing no movement of the rocker shaft R. Thus the movement of the lever L in this particular does not change the direction of rotation of the driven rear axle or shaft C, but only effects a change of the speed of rotation. It will also be understood that when the lever L is moved at right angles to the movement just referred to, the yoke 26 will swing bodily about the trunnions 30, causing the yoke Y and its rod 32 to move bodily. This movement will be communicated through the link 33 to the rocker shaft A and cause the latter to swing sufficiently, through the link 24, shaft 25 and yoke 21, to shift the clutch collar 18 toward the one or the other of the two beveled gears 15, 16, thereby reversing the direction of rotation of the shaft C without changing the speed of rotation; the recess 27 of the yoke 26 enabling the yoke to slide about the flange 25 of the clutch collar 12 without shifting said clutch collar.

P is a plate of the familiar H-type; that is to say, a plate provided with a recess shaped like the letter H. The control lever L extends through the H recess of the plate B and is thereby guided in its movement by the walls of said recess. It will thus be seen that but one lever controls both the change of speed and the change of direction of the driven shaft,—in this case, the rear axle C; and that the arrangement is such as to provide a high speed and a low speed for the forward movement as well as for the reverse or rear movement.

It will be noted that in the transmission device above described, placing of the two clutches H and H' on the shaft B gives me a very quick and easy control by being able to shift from one speed to the other without change of direction; and since the gears 1 and 3, and 2 and 4, are always in mesh great economy and efficiency is attained.

It will also be noted that with a single lever the change of speed, and change of direction and the operation of the clutch is effected, so as to greatly simplify the device and its operation. Also that I have a free running engine, that all end thrust on the bearings is avoided and that the parts, particularly the clutches are so assembled as to be readily accessible for cleaning and adjustment.

I claim as my invention:

1. In a power transmission device comprising a motor, a driving shaft actuated thereby, a driven shaft, a reversing unit for the driven shaft and high and low speed units intermediate the driving shaft and the reversing unit, a lever for shifting the reversing unit and for shifting from one speed unit to the other, and operative connections between the lever and the reversing unit and also between the lever and each of the speed units, said connections including a rocker shaft operatively connected at one end to the reversing unit and at its other end to said lever.

2. In a power transmission device comprising a motor actuated driving shaft, a driven shaft, a reversing unit, a pair of speed units, clutches intermediate said speed units for actuating either as desired and a clutch for actuating the reversing unit, a pivoted operating lever connected with each of said clutches, a rocker shaft, a link thereon, a clutch shaft pivotally mounted in the link and a yoke connected with the clutch shaft, a link-yoke pivotally mounted on the operating shaft, and a link on the rocker shaft slidingly connected with said link yoke.

3. In a transmission device of the character described embracing driving and driven shafts, speed gear units, a reversing gear unit and clutches, a single control lever pivotally mounted to swing in planes at right angles to each other, a clutch engaging yoke on the lever, a rocker shaft operatively connected at one end to the reversing unit, a yoke link on the lever, a link arm fixedly mounted on the rocker shaft and slidingly connected with the link yoke.

In testimony, that I claim the foregoing as my invention I affix my signature, in the presence of two witnesses, this 31st day of July, 1922.

EDWARD ROY BORDEN.

Witnesses:
B. L. MacGregor,
Taylor E. Brown.